(12) United States Patent
Dziurda

(10) Patent No.: US 10,093,182 B2
(45) Date of Patent: Oct. 9, 2018

(54) ADAPTIVE INSTRUMENT CLUSTER

(71) Applicant: GM GLOBAL TECHNOLOGY OPERATIONS LLC, Detroit, MI (US)

(72) Inventor: Robert A. Dziurda, Waterford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/399,923

(22) Filed: Jan. 6, 2017

(65) Prior Publication Data
US 2018/0194228 A1   Jul. 12, 2018

(51) Int. Cl.
*G06T 3/40* (2006.01)
*G06T 3/60* (2006.01)
*B60K 35/00* (2006.01)
*B60K 37/00* (2006.01)
*B60K 37/02* (2006.01)
*G06T 11/60* (2006.01)

(52) U.S. Cl.
CPC ............ B60K 37/02 (2013.01); G06T 3/60 (2013.01); G06T 11/60 (2013.01); *B60K 2350/1072* (2013.01); *B60K 2350/352* (2013.01)

(58) Field of Classification Search
CPC . G06T 11/60; G06T 15/30; G06T 3/00; G06T 3/40; G06T 3/60; G09G 2340/0492; G09G 2340/0407; G06F 3/0485; G06F 17/00; B60K 35/00; B60K 37/00; B60K 2350/00; B60K 2350/1004; B60K 2350/1056; B60K 2350/1072; B60K 2350/96; B60K 2350/962

USPC .......... 345/619, 620, 649, 660, 672
See application file for complete search history.

(56) References Cited

U.S. PATENT DOCUMENTS

| 9,469,195 B1 * | 10/2016 | Boss ............ B60K 35/00 |
| 2008/0224840 A1 * | 9/2008 | Kawachi ........ B60K 35/00 340/438 |
| 2015/0084764 A1 * | 3/2015 | Wunsche ....... B60K 35/00 340/462 |

FOREIGN PATENT DOCUMENTS

| DE | 102008000606 A1 | 10/2008 |
| DE | 102012005674 A1 | 4/2013 |
| DE | 102014113308 A1 | 3/2015 |

OTHER PUBLICATIONS

DPMA, German Office Action issued in German Application No. 10 2018 100 101.0, dated Aug. 6, 2018.

* cited by examiner

Primary Examiner — Ke Xiao
Assistant Examiner — Andrew Shin
(74) Attorney, Agent, or Firm — Lorenz & Kopf, LLP

(57) ABSTRACT

An adaptive instrument cluster for a vehicle actively repositions during driving so that at least one or more depicted instruments remain viewable at most steering wheel angles. The instrument cluster may include an electronic display on which one or more instruments are depicted during vehicle operation. An instrument cluster controller receives data representative of the steering wheel angle, and responsive thereto repositions the represented instruments on the electronic display so that at least one instrument remains viewable within an opening formed within the steering wheel.

18 Claims, 2 Drawing Sheets

ADAPTIVE INSTRUMENT CLUSTER

TECHNICAL FIELD

This patent generally relates to vehicle information systems, and more particularly, this patent relates to an adaptive instrument cluster to increase the viewability of information by the vehicle operator.

BACKGROUND

Vehicles for the road, such as passenger cars, trucks and vans, are designed to provide various amounts of information to the operator. Most vehicles have an instrument cluster that includes instruments or depictions of instruments and information such as: speedometer, tachometer, coolant and oil temperature, oil pressure, fuel, electrical system gages, gear selection, lateral acceleration, and the like positioned within view of the operator behind the steering wheel. In this position, the operator is able to observe the instruments during most driving activity.

As steering wheels are designed to include various interfaces, e.g., switches, to allow the operator to control any number of vehicle systems without removing their hands from the steering wheel, to incorporate airbag restraint systems, and to have larger rims for a more comfortable grip, the opening designed into the steering wheel to permit viewing of the instrument cluster is reduced. Moreover, during turns, the opening may be poorly positioned to permit viewing of the instrument cluster. As much as fifty-percent (50%) of the instrument cluster may be obscured as often as forty-seven percent (47%) of the time during normal driving.

While the amount of time the steering wheel might obscure the instrument cluster can be brief, during performance driving activities such as high performance driving education (HPDE) it is important to have vehicle operating information available to the operator and often precisely when the steering wheel is obscuring the instrument cluster. During autonomous vehicle operation information and indications of autonomous vehicle operation status needs to be viewable by the operator under all conditions.

Accordingly, it is desirable to provide within a vehicle an instrument cluster that reduces the likelihood of being obscured by the steering wheel during vehicle operation. Furthermore, other desirable features and characteristics of the devices, systems and methods of the herein described exemplary embodiments will become apparent from the subsequent detailed description and the appended claims, taken in conjunction with the accompanying drawings and the foregoing technical field and background.

SUMMARY

An adaptive instrument cluster for a vehicle in accordance with a herein described embodiment actively repositions depicted instruments during driving so that at least one or more of the depicted instruments remain viewable at most steering wheel angles. The instrument cluster may include an electronic display on which one or more instruments are depicted during vehicle operation. An instrument cluster controller receives data representative of the steering wheel angle, and responsive thereto repositions the represented instruments on the electronic display so that at least one instrument remains viewable within an opening formed within the steering wheel.

In another non-limiting example, a vehicle is provided. The vehicle may include an adaptive instrument cluster that repositions depicted instruments responsive to an angle of the steering wheel.

DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
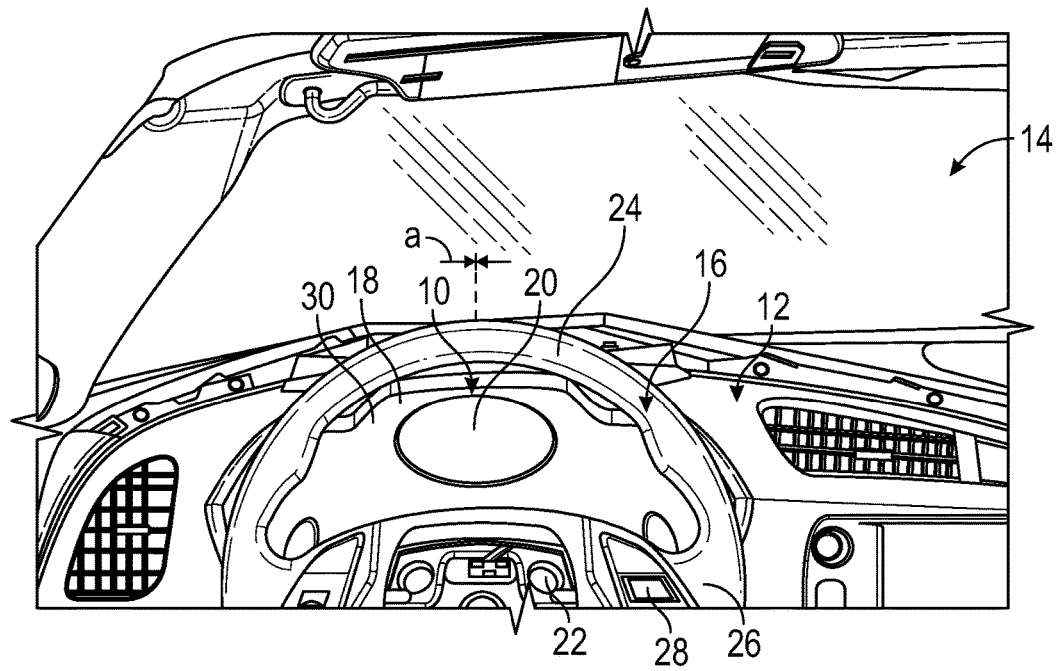
FIGS. 1-3 are graphic illustrations of an adaptive instrument cluster relative to a steering wheel in accordance with one or more of the herein described embodiments.

The following detailed description is merely exemplary in nature and is not intended to limit the application and uses. Furthermore, there is no intention to be bound by any expressed or implied theory presented in the preceding technical field, background, brief summary or the following detailed description. It should be understood that throughout the drawings, corresponding reference numerals indicate like or corresponding parts and features. As used herein, the term system or module may refer to any combination or collection of mechanical and electrical hardware, software, firmware, electronic control component, processing logic, and/or processor device, individually or in any combination, including without limitation: application specific integrated circuit (ASIC), an electronic circuit, a processor (shared, dedicated, or group), memory that executes one or more software or firmware programs, a combinational logic circuit, and/or other suitable components that provide the described functionality.

The exemplary embodiments may be described herein in terms of functional and/or logical block components and various processing steps. It should be appreciated that such block components may be realized by any number, combination or collection of mechanical and electrical hardware, software, and/or firmware components configured to perform the specified functions. For example, an exemplary embodiment may employ various combinations of mechanical components and electrical components, e.g., integrated circuit components, memory elements, digital signal processing elements, logic elements, look-up tables, or the like, which may carry out a variety of functions under the control of one or more microprocessors or other control devices. In addition, those skilled in the art will appreciate that embodiments described herein may be practiced in conjunction with any number of mechanical and/or electronic systems, and that the vehicle systems described herein are merely exemplary embodiment.

For the sake of brevity, conventional components and techniques and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in a herein described embodiment.

Figure 2:
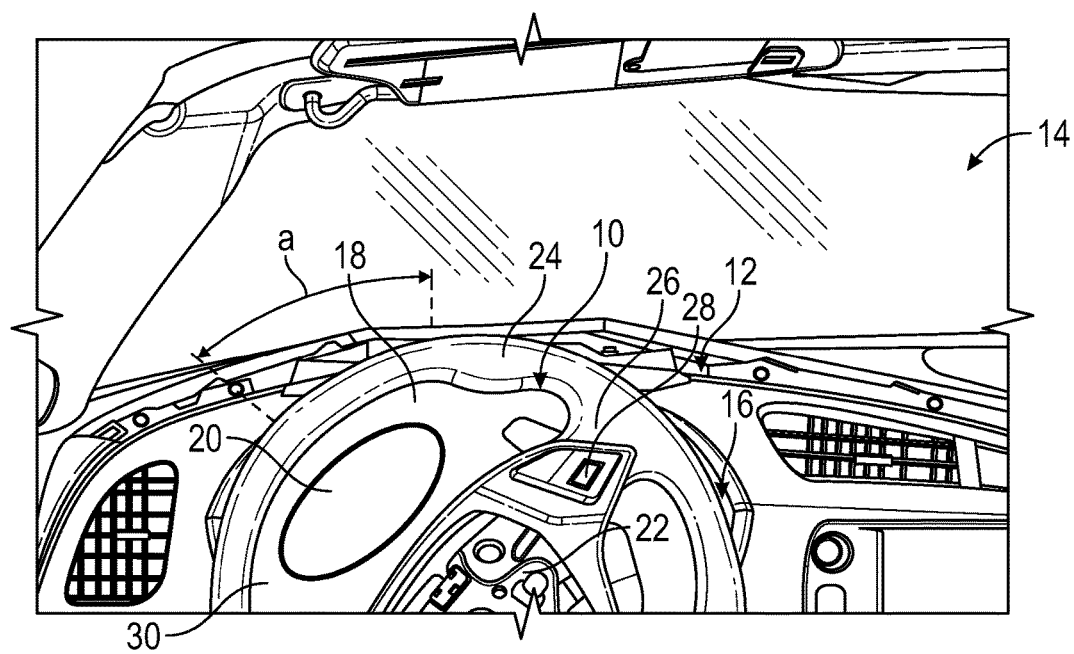
Figure 3:
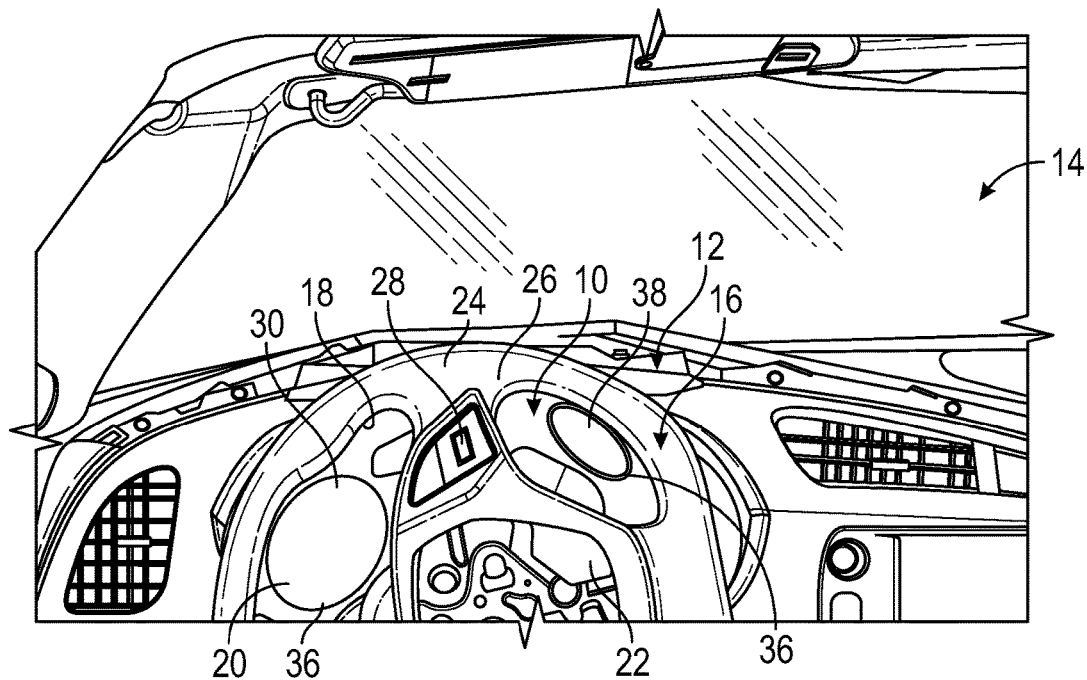

FIGS. 1-3 graphically depict an adaptive instrument cluster 10 disposed within an instrument panel assembly 12 of a vehicle 14. The cluster 10 is disposed behind, relative to the position of a vehicle operator, a steering wheel 16, which is used in a conventional manner to control the direction of travel of the vehicle 14. The steering wheel 16 is formed with an opening 18 through which the operator may see various instruments 20 depicted on the cluster 10. The steering wheel 16 also includes a rim 22 supported from a hub 24 via spokes 26. The hub 24 may include an airbag restraint (not depicted) and one or interfaces such as buttons or switches 28 may be positioned on the rim 22, hub 24 and/or spokes 26.

Figure 4:
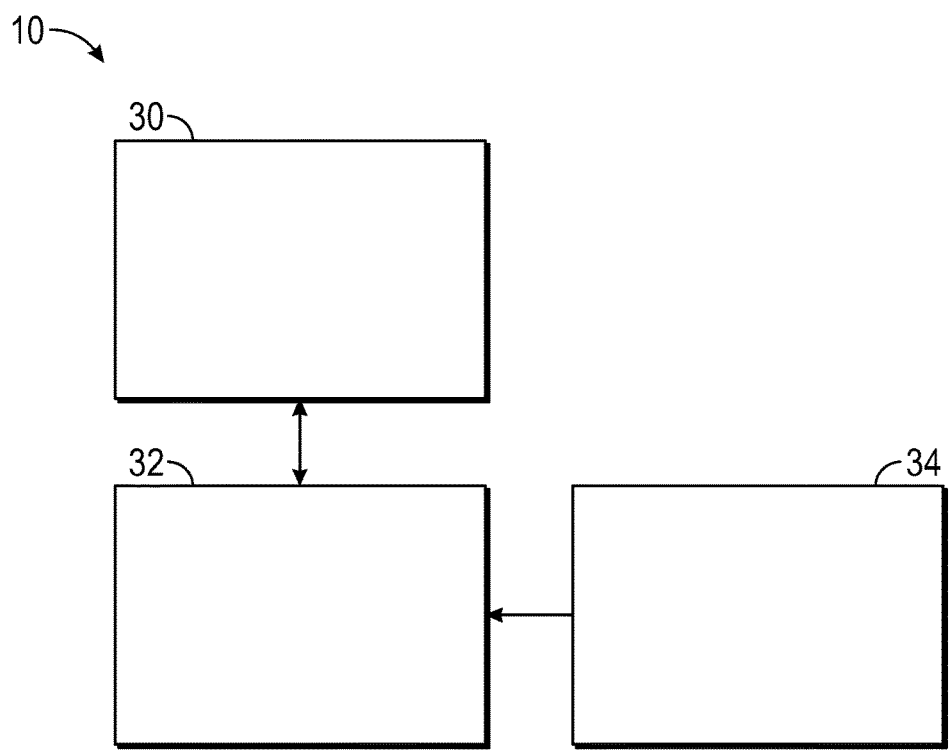
FIG. 4 is a block diagram illustration of an adaptive instrument cluster system in accordance with one or more of the herein described embodiments.

With continued reference to FIGS. 1-3 and reference to FIG. 4, the cluster 10 includes at least one electronic display 30 coupled to a display controller 32. The electronic display 30 may be a light emitting diode (LED), organic LED (OLED), liquid crystal (LCD) or any suitable electronic display that permits the depiction of one or more instruments, e.g., instrument 20, of the vehicle 14. As used herein, the term instrument 20 is meant to refer to the depiction of one or more instruments on the display 30. For example, the instrument 20 may be a collection of depictions of instruments, such as a speedometer, a tachometer, one or more engine parameters such as coolant and/or oil temperature, oil pressure, electric system charging status, selected gear indication, lateral acceleration indication, and the like. The display 30 may be partitionable, and it may be configured and reconfigured during operation of the vehicle 14 via the controller 32. For example, during normal operation the instrument 20 may be a speedometer, while during HPDE activities, the instrument 20 may be a tachometer, selected gear indicator and/or lateral acceleration indicator. In the event that one or more vehicle systems is reporting a fault condition, the instrument 20 may be an alert and/or a depiction of an instrument 20 associated with that system or function. The instrument 20 depicted on the display 30 may be selectable and reconfigurable by the vehicle operator.

The controller 32 is furthermore coupled to at least one other controller 34 disposed within the vehicle 14, such as a powertrain controller, to receive data to depict as an instrument 20 on the display 30. In accordance with a herein described embodiment, the controller 34 is at least a controller, such as a body or chassis controller, that provides data representing an angle alpha (a) of the steering wheel 16 to the controller 32. The controller 34 may also receive data from other controllers (not depicted) representing, for example, seat position, steering column angle and extension, and other data that defines the available viewing area of the display 30 via the opening 18 for a given operator seating position and steering wheel angle.

Most typically, the steering wheel angle is considered 0 degrees (a=0°) when the steering wheel 16 is oriented to cause the vehicle 14 to travel in a straight line, has a positive angle (+a) when the steering wheel 16 is oriented to cause the vehicle 14 to turn to the right and has an negative angle (−a) when the steering wheel 16 is oriented to cause the vehicle 14 to turn left. With the rotation of the steering wheel 16, the opening 18 also rotates. Because during most vehicle operation the vehicle 14 heads in a straight direction (FIG. 1), or with only slight deviations right or left, the opening is aligned so that with the steering wheel 14 angle substantially at a=0°, the opening 18 aligns to permit viewing of all or substantially all of the electronic display 30 and depicted instrument 20.

When turning the vehicle 14 to the right or left, the operator rotates the steering wheel 16 accordingly (FIGS. 2-3). The opening 18 rotates with the steering wheel 16, and it is no longer optimally aligned with the display 30 to permit viewing of depicted instrument 20 when depicted on a first portion of the display 30. To accommodate change in orientation (+/−a) of the steering wheel 16, the display 30 is reconfigured via the controller so that at least one of the depicted instrument 20 remains viewable through the opening 18 by depicting the instrument 20 on a second portion of the display 30 (FIGS. 2-3).

In accordance with the herein described embodiments, the controller 32 receives from the controller 34 data reflecting the current steering wheel angle, a. It then determines a portion of the display 30 that best aligns with the opening 18 to allow the operator to view the instrument 20 on the display 30. The controller 32 partitions the display 30 such that the instrument 20 is depicted on a portion of the display 30 allowing it to be viewed through the opening 18 given the current steering wheel angle as shown in FIGS. 2 and 3. Alternatively, the controller 32 may continuously determine a position on the display 30 to depict the instrument 20 such that the instrument 20 appears to move within the opening 18 as the steering wheel 16 is rotated from a first steering angle to a second steering angle.

As depicted in FIG. 3, only a reduced portion of the display 30 is viewable through the opening 18 when the steering wheel 16 is at an angle of approximately ninety degrees (a=~90°). Because a reduced portion of the display 30 is available to depict the instrument 20, a reduced set of instruments may be depicted, e.g., only vehicle speed, engine speed, gear selected and lateral acceleration. Alternatively, the depiction of the instrument 20 may be scaled to the apparent size of the opening 18 for a given steering wheel angle. A still further alternative is that the depiction of the instrument 20 represents a reduced set of instruments as well as scaling of the depicted instruments. The reduced set of instruments depicted, and scaling, if any, may be user selectable via an operator interface (not depicted).

Furthermore, the steering wheel 16 may include additional openings, one of which is depicted as opening 36, that with the steering wheel at angles, a=~90° or greater, reveal additional a portion of the display 30. The controller may be operable to depict an instrument 38 or information on the portion while the steering wheel 16 is at or greater than such an angle.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An adaptive instrument cluster disposed within an instrument panel of a vehicle relative to a steering wheel of the vehicle that is rotatable through a range of angles, the adaptive instrument cluster comprising:

an electronic display capable of depicting an instrument; and a controller coupled to the electronic display, the controller operable to cause the depiction of the instrument on the display, such that the instrument is depicted on a first portion of the display viewable through a first apparent opening within the steering wheel corresponding to a first angle of the steering wheel and on a second portion of the display, different than the first portion of the display, viewable through a second apparent opening within the steering wheel different than the first apparent opening corresponding to a second angle of the steering wheel different than the first angle of the steering wheel; wherein the depiction is a scaled depiction of the instrument of the vehicle, the scaled depiction of the instrument being sized to be viewed in its entirety within the second apparent opening, and wherein the controller is operable to determine a portion of the display on which to depict the instrument, such that the instrument appears to rotate as a smooth continuous animation in absolute orientation with the first apparent opening of the steering wheel as the steering wheel is rotated from the first angle to a second angle.

2. The adaptive instrument cluster of claim 1, wherein the instrument comprises vehicle operating information.

3. The adaptive instrument cluster of claim 1, wherein the instrument comprises a depiction of at least one instrument of the vehicle.

4. The adaptive instrument cluster of claim 3, wherein the instrument comprises at least one of a speedometer, a tachometer and a gauge.

5. The adaptive instrument cluster of claim 1, wherein the first portion corresponds with the first apparent opening of the steering wheel with the steering wheel at the first angle and the second portion corresponds with the second apparent opening with the steering wheel at the second angle.

6. The adaptive instrument cluster of claim 1, wherein the steering wheel comprises a third apparent opening and the display comprises a third portion aligned with the third apparent opening for one of the first angle and the second angle, the controller operable to depict a second instrument on the third portion such that the second instrument is viewable through the third apparent opening.

7. The adaptive instrument cluster of claim 1, wherein the instrument comprises a scaled depiction of the instrument of the vehicle angularly oriented to be aligned with and viewable through the second apparent opening.

8. The adaptive instrument cluster of claim 1, the depiction of the instrument on the first portion is a first set of instruments, and the depiction of the instrument on the second portion is a second set of instruments, different than the first set of instruments.

9. The adaptive instrument cluster of claim 1, the instrument being operator selectable.

10. A vehicle having an instrument panel and a steering wheel that is rotatable through a range of angles, the vehicle comprising:
an adaptive instrument cluster disposed within the instrument panel such that the adaptive instrument cluster is viewable through an opening within the steering wheel, the adaptive instrument cluster having an electronic display capable of depicting an instrument; and
a controller couple to the electronic display, the controller operable to cause the depiction of the instrument on the display, such that the instrument is depicted on a first portion of the display viewable through a first apparent opening within the steering wheel corresponding to a first angle of the steering wheel and on a second portion of the display, different than the first portion of the display, viewable through a second apparent opening within the steering wheel different than the first apparent opening corresponding to a second angle of the steering wheel different than the first angle of the steering wheel; wherein the depiction is a scaled depiction of the instrument of the vehicle, the scaled depiction of the instrument being sized to be viewed in its entirety within the second apparent opening, and wherein the controller is operable to determine a portion of the display on which to depict the instrument, such that the instrument appears as a smooth continuous animation in absolute orientation with the first apparent opening of the steering wheel as the steering wheel is rotated from the first angle to a second angle.

11. The vehicle of claim 10, wherein the instrument comprises vehicle operating information.

12. The vehicle of claim 10, wherein the instrument comprises a depiction of at least one instrument of the vehicle.

13. The vehicle of claim 12, wherein the instrument comprises at least one of a speedometer, a tachometer and a gauge.

14. The vehicle of claim 10, wherein the first portion corresponds with the first apparent opening of the steering wheel with the steering wheel at the first angle and the second portion corresponds with the second apparent opening with the steering wheel at the second angle.

15. The vehicle of claim 10, wherein the steering wheel comprises a third apparent opening and the display comprises a third portion aligned with the third apparent opening for one of the first angle and the second angle, the controller operable to depict a second instrument on the third portion such that the second instrument is viewable through the third apparent opening.

16. The vehicle of claim 10, wherein the instrument comprises a scaled depiction of an instrument of the vehicle angularly oriented to be aligned with and viewable through the second apparent opening.

17. The vehicle of claim 10, the depiction of the instrument on the first portion is a first set of instruments, and the depiction of the instrument on the second portion is a second set of instruments, different than the first set of instruments.

18. The vehicle of claim 10, the instrument being operator selectable.

* * * * *